United States Patent Office 2,967,106
Patented Jan. 3, 1961

2,967,106

ANIMAL FEED SUPPLEMENT AND METHOD OF MAKING SAME

Boris Kviesitis, Des Moines, Iowa, assignor to Vy Lactos Laboratories, Inc., Des Moines, Iowa No Drawing. Filed Mar. 4, 1959, Ser. No. 797,018

5 Claims. (Cl. 99—6)

This invention relates to the method of and means for treating dehydrated viscous materials, such as syrups, fish solubles, molasses, and like, and more particularly to a product prepared from such materials and fed to livestock, or for human consumption.

In the animal feed business blackstrap molasses is perhaps one of the most common products used in the preparing of food supplements for livestock. The reasons for this are that blackstrap molasses is relatively inexpensive, is a natural food for animals, and has an appealing taste. Fish solubles are also desirable material for such animal feed inasmuch as such solubles contain valuable vitamins, traces of minerals, and amino acids.

While such ingredients are all highly desirable, they are first most difficult to dehydrate. Even the dehydrating vat is quickly clogged by the sticky viscous particles adhering to the inside of the vat and associated equipment. This initial problem during the dehydrating phase has been substantially overcome as disclosed in my, and Willard E. Rogerson's, application on the Method of and Means for Dehydrating Flowable Matter, filed October 31, 1957, and bearing Serial Number 693,625. To overcome the sticking and caking of the product during the dehydrating of the sticky material, we added calcium hydroxide, a wind curtain to prevent the sticky material engaging the side of the dehydrating vat, and then after the sticky flowable material had been dried into dry granular material, we added some tricalcium phosphate to prevent the dried material from caking as it progressed through the cooling, separating, and packaging phases. While this treatment of the material solved the problems at the factory level, it did not solve the problem of caking at point of use. It was found that the animal raiser would open a sealed package of the material, use part of it at one feeding, and save the rest for later feeding. There was just enough moisture in the atmosphere to affect the material and render it non-pourable. In fact, if the sack of material were not rapidly used, the remainder in the sack would become so caked and solidified as to be unusable. Obviously, the dehydrated granular material produced originally from molasses and like is mixed with other animal feed at time of use. It is, therefore, absolutely necessary that the dehydrated viscous materials be of pourable granular nature at time of use.

Therefore, one of the principal objects of my invention is to provide a method of and means for rendering dehydrated viscous materials non-cakable at point of use although subjected to the normal moisture within the atmosphere.

A further object of this invention is to provide a new product of manufacture for feeding animals that may be easily mixed with other animal feeds.

A still further object of this invention is to provide a new product of manufacture for use with other edibles for human consumption.

Inasmuch as my method of treatment depends also upon the dehydrating of the blackstrap molasses, fish solubles, and like, it is first necessary to explain the original steps of dehydration. Blackstrap molasses is composed of a solution primarily of sugars and organic acids and minerals in which some colloidal substances, such as gum and insoluble minerals, are suspended. Particles of this colloidal substance are of different sizes, thus presenting problems in dehydration process. Success of drying depends on uniform atomization of liquid material. Therefore, molasses should be purified from all colloidal parts which are interfering in proper atomization.

Generally, molasses is sold of density ranging from 79.5 to 90° Brix. Purification of this molasses is accomplished by the following method:

(1) Molasses diluted with water to 42° Brix;
(2) Heated to 90–100° F.;
(3) One percent by weight of calcium hydroxide added and the mixture agitated for ten minutes.
(4) Mixture is left in a vertical tank with conical bottom for twelve to twenty-four hours to allow to settle suspended colloidal particles. The clear supernatant liquid is then transferred to operating tanks. This purified liquid is ready for dehydration.

The diluted molasses or like, after purification, is then first heated to approximately 190° F. and the final drying is usually accomplished by hot air at temperatures of approximately 300–400° F. The result is a dry powder and, in order that it will continue as such through the rest of the processes, including packaging, approximately one percent by weight of tricalcium phosphate is injected into the powdered material.

In order that the processed material thus far described will not harden and cake from long storage, or at point of use, I add into the product a wetting agent sometimes known as surface active agents. Most present day detergents use wetting agents. There are several different wetting agents. A product sold under the trademark "Advawet" is a good wetting agent.

As herebefore noted, most dried molasses and syrup products possess undersirable physical natures such as being hygroscopic, having high surface and interface tension, and a very poor penetrating characteristic. For example, dried molasses products, and which are use with grain, forages, mineral ingredients, and such animal feeds, do have these objectionable characteristics. The dried molasses or like must have an adaptability for use in ordinary mixing equipment. The added molasses product cannot possess balls, lumps, cakes, or solid portions. As before indicated, the answer is the treatment of the dried molasses, or like, with a material which possesses surface active properties so that the final dried product will have lyophilic nature and with good material blending and working characteristics, I find the following excellent wetting agents:

Lecithin
Sorbitol
Sulfonated oil or fat
Miscellaneous esters of polyglycerols and many other nonionic, anionic and cationic surfactants While such surfactants may be added to the liquid molasses prior to the dehydrating, they also may be added during the last stages of the drying and processing operations. Obviously, however, they must be added to the product at time of packaging. As indicated, various wetting agents may be used but I particularly recommend lecithin. Lecithin is a natural product, occurring almost universally in the cells of plant and animal life. Highest concentrations are found in egg yolk, brain and nerve tissue, and oil-bearing seeds. It is apparent that lecithin carries out essential, but as yet vaguely defined functions of cellular metabolism in the living organism. Although known for many years, lecithin only recently has come into its own as a versatile component of many manufactured items. This accelerating interest has followed the more recent production of abundant, low-cost, high-quality lecithin from soybean oil. Soybeans are so important as a commercial source of lecithin, that in trade usage today the term "lecithin" used alone, generally refers to the phosphatides prepared from soybean oil. New uses for lecithin in widely divergent industries are being discovered at an ever increasing rate.

Commercial soybean lecithin is a light brown, waxy substance of bland taste and neutral odor. It is relatively stable at room temperature for long periods of time. Being hygroscopic, it must be stored in tightly closed containers. It is readily soluble in most organic solvents, partly soluble in alcohols and esters and insoluble in acetone. Advantage is taken of the phosphatides' insolubility in acetone to remove the soybean oil in preparing oil-free phosphatides. Lecithin dissolves readily in warm mineral, vegetable, or animal oils. Generally speaking, unmodified lecithin contains about 65% of the acetone insoluble phosphatides and about 35% of the acetone soluble soybean oil. The oil serves as a solvent and carrier for the phosphatides, as well as contributing to their stability.

Commercial lecithin is not a single chemical entity. It is a mixture composed primarily of lecithin, cephalin and adsorbed soybean oil with a small amount of carbohydrate material and phytosterols. Pure lecithin is a glyceride which may be described as a modified fat (or oil) in which the two fatty acid radicals are oil soluble and the phosphocholine radical is water soluble. Thus is explained the surface active properties which make lecithin an excellent emulsifying agent. Concentrating at the interfaces, lecithin acts as a bond between the finely dispersed phases and, at the same time, prevents coalescing of the particles. The particles remain finely divided and dispersed in a stable emulsion.

As a specific example of the present invention, lecithin at the rate of two parts by weight is added to 98 parts by weight of spray dried molasses powder and mixed in conventional ball mill or any other suitable blending equipment until uniform material is obtained. This product can be modified to have a more free flowing character, in this case .5 or 1.0% by weight of non-caking compound, such as tricalcium phosphate, is added and mixed in a conventional Ribbon or any other suitable mixer.

Another example of blending surfactants with molasses prior to drying is as follows:

Molasses diluted with water to 50 parts of molasses solid by weight and 50 parts of water by weight.
Solution is then vigorously agitated and dried in a conventional spray drier.
Dried product will then possess all good dispersing and non-sticking properties.

This product also can be modified with the addition of .5 or 1.0% by weight of tricalcium phosphate.

With the product so treated, as above described, it will not objectionably cake or solidify at point of use.

Some changes may be made in my product of manufacture and method of making same without departing from the real spirit and purpose of my invention, and it is my intention to cover by my claims, any modified methods or use of equivalents which may be reasonably included within their scope.

I claim:

1. As a new product of manufacture for mixing with an edible food, dehydrated molasses, and lecithin.
2. As a new product of manufacture for mixing with an edible food, dehydrated molasses, and approximately two percent by weight of lecithin.
3. The method of producing a feed supplement for animals, comprising, the taking of a volume of molasses, dehydrating the molasses to a dry state, and the mixing into the dehydrated molasses a wetting agent selected from the group consisting of lecithin and sorbitol.
4. The method of producing a feed supplement for animals, comprising, the taking of a volume of molasses, dehydrating the molasses to a dry state, and the mixing into the dehydrated molasses two percent by weight of lecithin.
5. The method of producing a feed supplement for animals, comprising, the taking of a volume of viscous matter from the group consisting of molasses and fish solubles, the dehydrating of the same, and mixing the same with a wetting agent to reduce subsequent caking.

References Cited in the file of this patent
UNITED STATES PATENTS

| | | |
|---|---|---|
| 2,287,838 | Stanley | June 30, 1942 |
| 2,556,111 | Sargent | June 5, 1951 |
| 2,566,549 | Beckwith et al. | Sept. 4, 1951 |